G. G. MILNE.
ELECTRICAL REGULATING APPARATUS.
APPLICATION FILED JUNE 18, 1915.
1,320,487.
Patented Nov. 4, 1919.
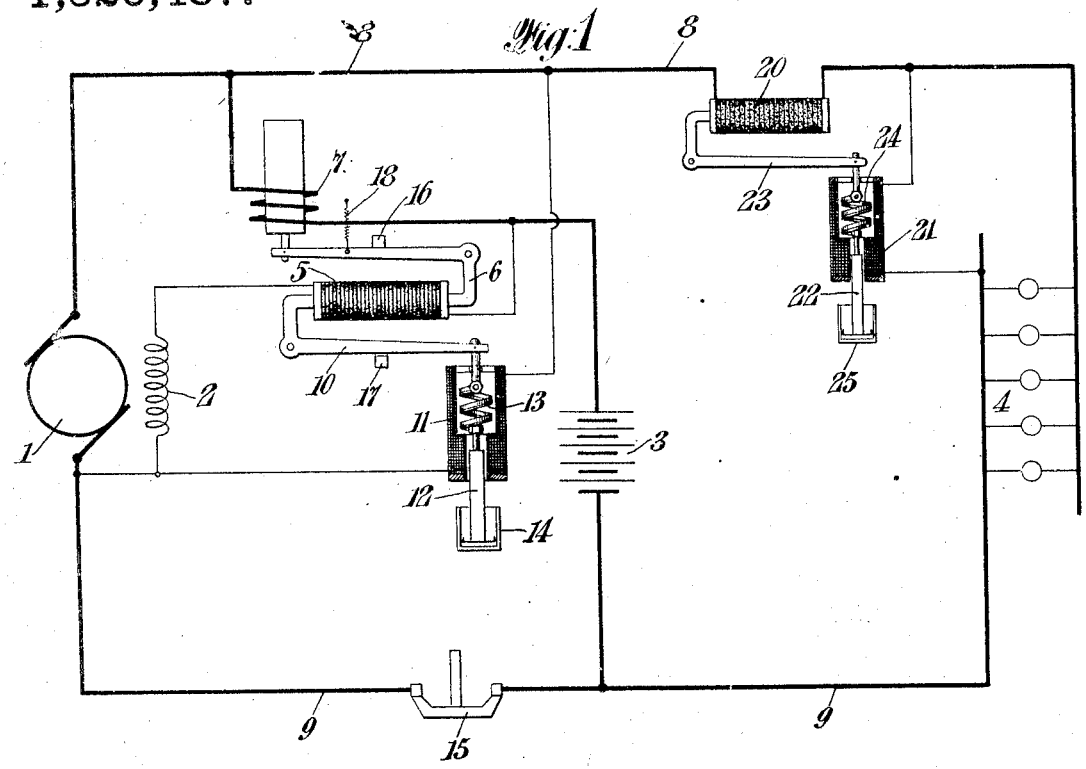
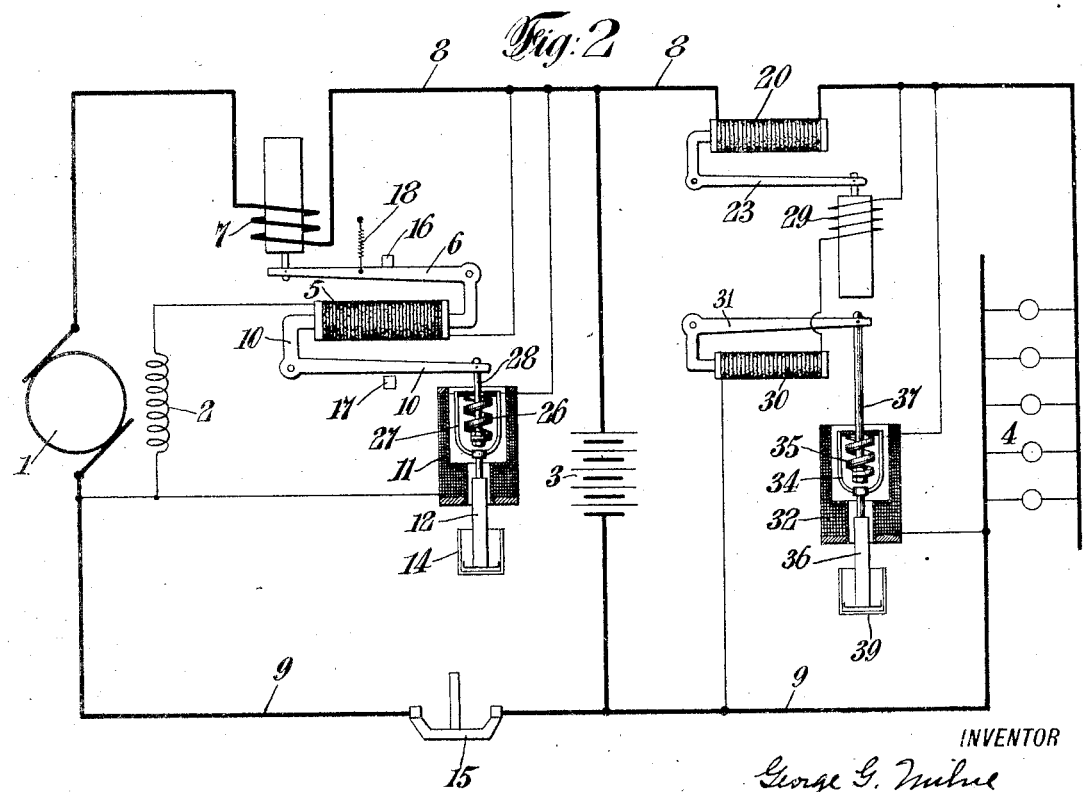
INVENTOR
George G. Milne
BY
Kenyon & Kenyon
ATTORNEYS

UNITED STATES PATENT OFFICE.

GEORGE G. MILNE, OF RYE, NEW YORK, ASSIGNOR TO GOULD COUPLER COMPANY, A CORPORATION OF NEW YORK.

ELECTRICAL REGULATING APPARATUS.

1,320,487. Specification of Letters Patent. Patented Nov. 4, 1919.

Application filed June 18, 1915. Serial No. 34,813.

*To all whom it may concern:*

Be it known that I, GEORGE G. MILNE, a citizen of the United States, and a resident of Rye, county of Westchester, and State of New York, have invented certain new and useful Improvements in Electrical Regulating Apparatus, of which the following is a specification.

My invention relates to improvements in electrical regulating apparatus and more particularly to the effecting of electrical regulation by temperature variations on magnet windings. In many systems there are provided solenoids or magnets which are adapted to effect regulation of a circuit responsive to voltage changes. As the magnet or solenoid windings become energized the temperature thereof is materially increased and this increase in temperature increases or varies the resistance of the windings so that the magnet or solenoid responds differently with different temperatures when the same voltage is applied to the windings or responds at a different voltage with each change in temperature. By my invention the effect of temperature changes on the windings is either compensated for or controlled so that undesirable effects thereof are not produced and the desired regulation is obtained. My invention will be found useful in many situations, but it is especially applicable to the compensation of the effect of temperature changes on the voltage solenoids which regulate electrical circuits in car-lighting systems. In Figure 1 of the accompanying drawings I have therefore illustrated diagrammatically the invention as applied to the regulation of generator voltage and lamp voltage in a car-lighting system, and in Fig. 2 a modification is illustrated.

Referring to Fig. 1, 1 represents a generator driven at a variable speed as from a car axle and 2 a shunt field therefor. 3 represents a storage battery and 4 lamps connected across the mains 8 and 9 and adapted to be supplied by the generator. 5 represents a carbon-pile rheostat in series with the field 2 having operating on one end a lever 6 controlled by a solenoid 7 in series in the battery circuit. The pile 5 has operating upon its other end a lever 10 controlled by a voltage solenoid 11 connected across the generator and battery. To this end there coöperates with the solenoid 11 a core 12 connected to the lever 10 by means of a thermostat 13. The thermostat 13 is situated within a suitable space in the solenoid or magnet 13 so as to be subjected to temperature variations of the windings thereof and is composed of two parallel pieces of different metals having unlike coefficients of expansion and formed into a spiral so that as the temperature thereof increases the spiral coil contracts and pulls the core 12 into a stronger magnetic field in the solenoid.

14 represents a dash-pot for the core 12 and 15 an automatic main switch for connecting the generator in circuit when its voltage has been built up sufficiently. A stop 16 is provided for the lever 6 and a stop 17 for the lever 10.

With the system in operation and the battery charging the charging current is maintained substantially constant by reason of the solenoid 7 acting through the lever 6 to vary the resistance of pile 5 and so varying the current in the field 2 that the generator will furnish sufficient voltage to maintain this charging current as long as the generator speed is sufficient. When the battery has become substantially charged, indicated by a certain rise in voltage thereacross, the voltage solenoid 11 becomes sufficiently energized to lift the core 12 which raises the lever 10 and thereafter assumes control of the pile 5 and field 2 so that the generator voltage is limited and the charging current decreased and the charging stopped. The decrease in charging current weakens the solenoid 7 permitting the spring 18 to retract the lever 6 against the stop 16 so that the control of the pile 5 is now wholly by the voltage solenoid 11.

From what has been said it will be seen that the battery voltage at which the solenoid 11 assumes control of the pile 5 to regulate the generator voltage would vary with the temperature of the solenoid because temperature changes vary the resistance of the windings of the solenoid and consequently its pulling power, if it were not for the thermostat 13, which as the temperature increases contracts so as to draw the core 12 into a stronger field in the solenoid so that with a given voltage across the battery the pulling effect of the solenoid will be the same irrespective of the variations in temperature of the solenoid and the consequent variations in current therein. The thermostat 13 therefore acts to compensate for the effect of temperature changes on the resistance of the solenoid and regulates the effect of the solenoid on the core and of the core on the rheostat to compensate for such temperature changes.

I have shown in series between the battery and lamps 4 a carbon-pile rheostat controlled by a similar solenoid 21 having a core 22 operating a lever 23 through a similar thermostat 24. The solenoid 21 is connected across the lamp circuit so as to be responsive to voltage variations thereof and so maintain the voltage across the lamps substantially constant through variations in voltage across the battery. The thermostat 24 operates the same as the thermostat 13 to regulate the pull of the magnet or solenoid 21 on the armature member or core 22 to compensate for the effect of changes in temperature on the resistance of the magnet windings. A dash-pot 25 is shown provided for the core 22.

The system shown in Fig. 2 is similar to that of Fig. 1 except that the coil 7 is connected in series with both the battery and lamps and the solenoid 11 is provided with a thermostat 26 which expands with increase of temperature instead of contracting. To use this form of thermostat the core 12 is connected to the top of the thermostat by means of a yoke 27 while the lever 10 is connected to the bottom of the thermostat by means of a link 28 so that as the thermostat expands with increasing temperature the yoke 27 is raised and with it the core 12 pulling the core into a stronger field in the solenoid as was the case with the system of Fig. 1.

Also in Fig. 2 instead of providing a solenoid operating the lever 23 to control the voltage at the lamps, which has a thermostat for compensating for temperature changes thereof a simple solenoid 29 may be provided, connected across the lamps and having in series therewith a carbon-pile rheostat 30 operated by a lever 31 controlled by a solenoid 32 connected across the lamps to be responsive to voltage variations thereof. The solenoid 32 is provided with a coöperating core 36 connected to the upper end of a thermostat 35 by means of a yoke 34, the lower end of the thermostat being connected to the lever 31 by means of a link 37. The thermostat 35 is situated so as to be affected by temperature changes of the solenoid 32. A dash-pot 39 is provided for the core 36. Any increase in voltage across the lamps increases the strength of solenoid 32 thereby lifting the core 36 to exert a greater pressure on the pile 30 through the lever 31 and so decreasing the resistance of the pile 30 which causes the solenoid 29 to be strengthened, thereby relieving the pressure on the pile 20 and increasing the resistance thereof in series with the lamps so as to maintain the voltage on the lamps substantially constant. With a decrease in voltage on the lamps the parts operate in the reverse manner to maintain the voltage on the lamps substantially constant. The thermostat 35 so affects the action of the regulating solenoid 32 that temperature changes therein do not materially affect the voltage at which it acts to maintain the voltage on the lamps substantially constant.

Obviously the thermostats may be adjusted to only partially compensate for the temperature changes or to over-compensate for such changes as such effects may be found desirable in some of the many systems and situations to which my invention is applicable. Other changes and modifications may also be made, and I do not desire to be limited to the details shown and described, but intend to cover all embodiments coming within the scope of the appended claims.

Having fully and clearly described my invention, what I claim as new and desire to secure by Letters Patent is:

1. The combination of a solenoid, a single unit core therefor, a thermostat situated within the solenoid responsive to the temperature changes of the solenoid and connected to and adapted to transmit the pull of the core and acting to vary the position of the core within the solenoid to regulate the pull of the solenoid on the core and compensate for the effect of temperature resulting in changes on resistance of the solenoid.

2. The combination of a regulating solenoid and its coöperating core, a thermostat situated within the solenoid and subjected to the temperature of said solenoid and carrying the pull of the core and controlling the core to maintain a uniform effect of the solenoid on the core notwithstanding temperature variations in the solenoid.

3. The combination of a solenoid and its core, a thermostat connected to the core and adapted to transmit the pull of the core to means operated on by the core, said thermostat being subjected to the temperature of said solenoid and acting to offset the effect on the solenoid of temperature variations.

4. The combination of a solenoid, a core for said solenoid, means controlled by said core, a thermostat within said solenoid and operatively connected between said core and said means whereby the ultimate effect of said solenoid upon said means is the same under given conditions regardless of temperature.

5. The combination of a regulating solenoid and its coöperating core, a thermostat subjected to the temperature of said solenoid and connected to the core and acting to vary the relation of the core to the means operated upon by the core and to force the core into a stronger magnetic field of the solenoid with increases of the temperature than it otherwise would receive to compensate for the effect of temperature resulting in changes of the resistance of the solenoid.

6. The combination of a solenoid, a core therefor, means limiting the movement of said core out of said solenoid, a thermostat connected to said core and said limiting means whereby the core is brought within a stronger magnetic field upon increase of temperature within the solenoid due to the action of the thermostat than it would ordinarily receive.

In testimony whereof, I have signed my name to this specification.

GEORGE G. MILNE.